F. Bush. Coal Car Coupling Hook.
No. 119,117. Patented Sep. 19, 1871.

Witnesses:
A. W. Almquist
Wm. H. C. Smith

Inventor:
F. Bush
Per [signature]
Attorneys.

UNITED STATES PATENT OFFICE.

FRANK BUSH, OF BOONTON, NEW JERSEY.

IMPROVEMENT IN COUPLING-HOOKS FOR COAL-CARS.

Specification forming part of Letters Patent No. 119,117, dated September 19, 1871.

*To all whom it may concern:*

Be it known that I, FRANK BUSH, of Boonton, in the county of Morris and State of New Jersey, have invented a new and useful Improvement in Coal-Car Coupling-Hook; and I do hereby declare that the following is a full, clear, and exact description thereof, which will enable others skilled in the art to make and use the same, reference being had to the accompanying drawing forming part of this specification, in which—

Figure 1:
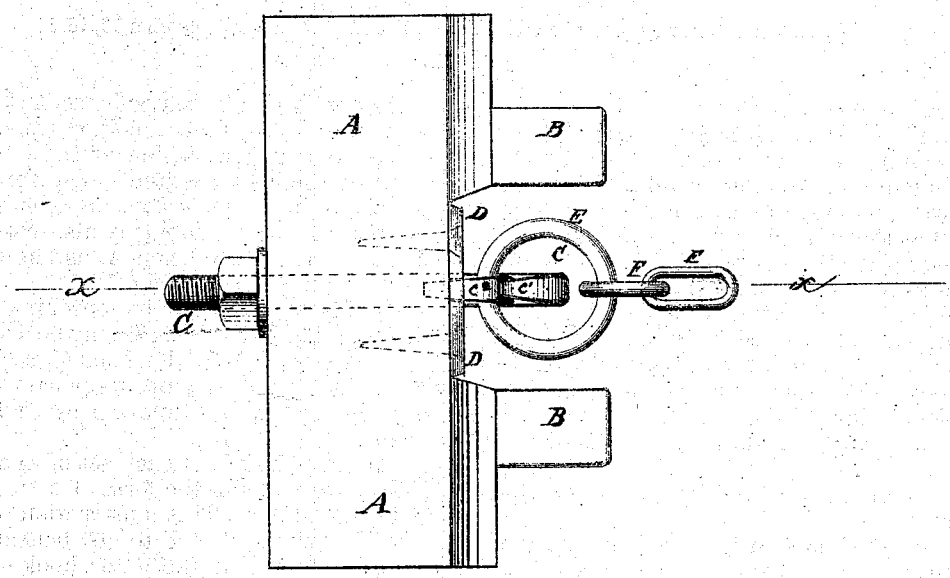
Figure 2:
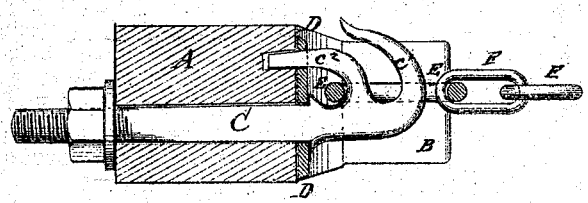

Figure 1 is a top view of my improved coupling-hook as attached to a draw-beam. Fig. 2 is a sectional view of the same taken through the line $x\,x$, Fig. 1, and showing the hook in side view.

Similar letters of reference indicate corresponding parts.

My invention has for its object to improve the construction of the hooks for coupling coal-cars, by means of which the coupling-links may be conveniently detached and attached without its being necessary to detach the entire hook and take it to the repair shop; and it consists in the second or inner hook that receives the ring, as hereinafter more fully described.

A is the cross-beam of the car, to which the bumpers B are attached. C is the coupling-hook, the shank of which is made square and passes through a square hole in the plate D attached to the forward side of the beam A, and through the beam A, where it is secured in place by a nut and washer in the ordinary manner. $c^1$ is the outer or forward hook, upon which the link is hooked in coupling the cars.

In the ordinary coupling-hook the inner link is passed through a hole in the forward part of the shank of the hook, and is then welded, so that when it was necessary to repair or renew the link the entire hook had to be detached from the car and taken to the shop, where it required at least three men to handle it upon the anvil while the link was being welded.

To avoid this inconvenience and expense I form a second or inner hook, $c^2$, upon the shank of the hook C, just inside of the hook $c^1$. The point of the hook $c^2$ extends back parallel with the shank of the hook C, so as to enter a hole in the plate D, which hole may also extend into the forward side of the beam A, as shown in Fig. 2 and in dotted lines in Fig. 1.

By this construction, by loosening the hook C the coupling-link or ring E may be readily placed in or removed from the hook $c^2$, and when the hook C is again drawn to its place it will be impossible for the said link or ring to become detached.

The inner link E of each set of coupling-links I prefer to make in the form of a ring, as shown in Figs. 1 and 2. This construction makes it impossible for the ring E to get beneath or catch upon the point of the outer hook $c^1$, and thus remedies a defect in the coupling as usually constructed, since the link E, when made long and narrow, frequently catches upon the point of the hook $c^1$, and when the train is started and the draft strain comes upon the coupling either the link or hook is broken. The other links F may be made in the ordinary manner.

Having thus described my invention, I claim as new and desire to secure by Letters Patent—

1. The inner hook $c^2$, formed upon the shank of the coupling-hook C in such a manner that its point may enter a hole in the plate D, substantially as herein shown and described, and for the purpose set forth.

2. The ring E, in combination with the links F and the hooks $c^1\,c^2$ of the coupling-hook C, substantially as herein shown and described, and for the purpose set forth.

FRANK BUSH.

Witnesses:
NEWTON S. KITCHEL,
A. A. NEAL.                                (20.)